(12) United States Patent
Jung et al.

(10) Patent No.: US 8,714,535 B2
(45) Date of Patent: May 6, 2014

(54) UNIVERSAL MACHINE TOOL INCLUDING A CHIP COLLECTING SPACE

(71) Applicant: Deckel Maho Pfronten GmbH, Pfronten (DE)

(72) Inventors: Robert Jung, Pfronten (DE); Alfred Geissler, Pfronten (DE)

(73) Assignee: DECKEL MAHO Pfronten GmbH, Pfronten (DE)

( * ) Notice: Subject to any disclaimer, the term of this patent is extended or adjusted under 35 U.S.C. 154(b) by 0 days.

(21) Appl. No.: 13/758,995

(22) Filed: Feb. 4, 2013

(65) Prior Publication Data

US 2013/0207331 A1    Aug. 15, 2013

(30) Foreign Application Priority Data

Feb. 6, 2012 (DE) .......................... 10 2012 201 736

(51) Int. Cl.
  *B23Q 1/64* (2006.01)
  *B23Q 11/08* (2006.01)
  *B23Q 1/01* (2006.01)
  *B23Q 7/00* (2006.01)

(52) U.S. Cl.
  USPC .............................. 269/57; 409/202; 409/134

(58) Field of Classification Search
  USPC ............. 269/57; 409/201, 202, 558, 137, 134
  See application file for complete search history.

(56) References Cited

U.S. PATENT DOCUMENTS

| | | | | |
|---|---|---|---|---|
| 4,173,817 A | * | 11/1979 | Voglrieder et al. | 483/14 |
| 4,187,601 A | * | 2/1980 | Aldrin | 29/560 |
| 4,893,971 A | * | 1/1990 | Watanabe et al. | 409/80 |
| 4,970,765 A | * | 11/1990 | Sakawa et al. | 29/33 P |
| 4,982,831 A | * | 1/1991 | Irie et al. | 198/617 |
| 4,999,895 A | * | 3/1991 | Hirose et al. | 29/33 P |
| 5,205,806 A | * | 4/1993 | Ishida et al. | 483/18 |
| 5,329,457 A | * | 7/1994 | Hemmerle et al. | 700/193 |
| 5,669,867 A | * | 9/1997 | Hoppe | 483/55 |

(Continued)

FOREIGN PATENT DOCUMENTS

| | | |
|---|---|---|
| DE | 198 30 391 A1 | 1/2000 |
| DE | 102 45 058 A1 | 4/2004 |

(Continued)

OTHER PUBLICATIONS

German Examination Report dated Oct. 22, 2012, in German Patent Application No. 10 2012 201 736.4 filed Feb. 6, 2012, 9 pages.

*Primary Examiner* — Alvin Grant
(74) *Attorney, Agent, or Firm* — Christensen O'Connor Johnson Kindness PLLC

(57) ABSTRACT

A machine tool comprising a machine column, a work spindle moveable in guides along the machine column in two coordinate axes by a motor and adapted to receive a cutting tool, a machine bed arranged on the front end of the machine column and on the top side of which a horizontal linear guide for a workpiece table is arranged, and a linear motor for moving the workpiece table in the horizontal linear guide in a further coordinate axis. A channel-like chip space for collecting chips accumulating when the workpiece is machined extends on the top side of the machine bed in the direction of the further coordinate axis. The linear motor is arranged on the top side of the machine bed laterally and parallel to the channel-like chip space, wherein first and second guide rails of the horizontal linear guide are arranged on opposite sides of the linear motor.

8 Claims, 6 Drawing Sheets

(56) References Cited

U.S. PATENT DOCUMENTS

| | | | | |
|---|---|---|---|---|
| 5,674,169 A | * | 10/1997 | Yang | 483/32 |
| 5,943,750 A | * | 8/1999 | Koren et al. | 29/26 A |
| 6,039,680 A | * | 3/2000 | Oketani et al. | 483/57 |
| 6,099,216 A | * | 8/2000 | Momochi et al. | 409/132 |
| 6,120,222 A | * | 9/2000 | Hiramoto et al. | 409/134 |
| 6,224,462 B1 | * | 5/2001 | Yokoyama et al. | 451/10 |
| 6,357,094 B1 | * | 3/2002 | Sugimoto | 29/27 C |
| 6,357,977 B1 | * | 3/2002 | Momochi et al. | 409/132 |
| 6,454,636 B1 | * | 9/2002 | Iwabuchi | 451/53 |
| 6,632,054 B2 | * | 10/2003 | Geiger et al. | 409/202 |
| 6,641,341 B2 | * | 11/2003 | Sato et al. | 409/137 |
| 6,682,276 B2 | * | 1/2004 | Harami et al. | 409/134 |
| 6,746,188 B2 | * | 6/2004 | Watanabe | 409/201 |
| 6,796,012 B2 | * | 9/2004 | Geissler et al. | 29/27 C |
| 6,884,009 B2 | * | 4/2005 | Maeda | 409/134 |
| 7,018,147 B2 | * | 3/2006 | Hiramoto et al. | 409/134 |
| 7,044,693 B2 | * | 5/2006 | Fujiwara | 409/137 |
| 7,201,546 B2 | * | 4/2007 | Ichino et al. | 409/165 |
| 7,273,335 B2 | * | 9/2007 | Furuhashi et al. | 409/202 |
| 7,506,426 B2 | * | 3/2009 | Ryuhan et al. | 29/558 |
| 7,625,162 B2 | * | 12/2009 | Stein | 409/168 |
| 7,627,937 B2 | * | 12/2009 | Jung | 29/33 P |
| 7,645,103 B2 | * | 1/2010 | Schmidt et al. | 409/168 |
| 8,262,326 B2 | * | 9/2012 | Lechleiter et al. | 409/201 |
| 2010/0221082 A1 | | 9/2010 | Meidar | |

FOREIGN PATENT DOCUMENTS

| | | |
|---|---|---|
| DE | 100 61 934 B4 | 6/2005 |
| DE | 10 2007 044 289 A1 | 3/2009 |
| DE | 20 2007 013 009 U1 | 3/2009 |
| EP | 1 402 991 A2 | 3/2004 |
| EP | 1 477 267 A2 | 11/2004 |
| WO | 2008/050024 A1 | 5/2008 |

* cited by examiner

UNIVERSAL MACHINE TOOL INCLUDING A CHIP COLLECTING SPACE

FIELD

The present application relates to a universal machine tool for machining workpieces.

BACKGROUND

DE 100 61 934 B4 and DE 102 45 058 A1 disclose machine tools, which, due to their make, are distinguished by a special rigidity and thus also a high-cutting capacity as well as high accuracy during the machining operation. This machine tool has a dimensionally rigid machine column at the front end of which a work spindle is guided in guide rails and is arranged in a horizontally and vertically movable fashion. The universal machine tool comprises a highly rigid machine bed which is arranged at the front end of the machine column and the top side of which accommodates a horizontal linear guide for a workpiece table that can be moved by means of a linear motor in a further coordinate axis Z along the machine bed.

The chips accumulating with universal machine tools can be relatively extensive. For this reason, the protection of the machine units and components from flying chips as well as the collection and removal of accumulating chips have always been an inherent problem in the machining of metals by means of universal machine tools.

It has thus been proposed in the prior art to provide chip collecting and removing spaces when machine tools are designed. For example, DE 198 30 391 A1 proposes a milling machine in which the workpiece spindle is movably guided in a cantilever arrangement and a chip collecting space extending in the transverse direction relative to the machine bed is located at the rear end of the machine table in the direct vicinity of the workpiece clamping surface of the workpiece table. However, this design is not very suitable for a workpiece table which can be moved horizontally on the machine bed in a longitudinal direction since a reliable chip collection and removal would not be ensured in this case.

In addition, the provision of a chip collecting space is accompanied by design limitations as far as the fundamental configuration of the machine frame and of the machine column is concerned. An important aspect is to guarantee a sufficiently high rigidity of both the machine column and the machine bed.

A heavy-duty machining center which ensures a reliable and extremely fast chip disposal from the work area has been presented by the company StarragHeckert, by means of the CWK 400 D machining centers. However, the machine configuration of this machining center, which is a cross-bed design having an inclined bed, is rather complicated and not very compact.

BRIEF SUMMARY

Disclosed herein is a universal machine tool that is as compact as possible and is improved as regarding the collection and removal of accumulating chips, without reducing the rigidity of the machine frame.

The universal machine tool has a dimensionally stable machine column along which a work spindle is guided, which can be moved in guides in two coordinate axes X and Y by means of a motor and is adapted to receive a cutting tool. At the front end of the machine column a machine bed is attached, and the top side of said bed is provided with a horizontal linear guide for a workpiece table and a linear motor for moving the workpiece table in the horizontal linear guide with a further coordinate axis.

A channel-like chip space for collecting chips accumulating when the workpiece is machined is provided in or on the machine bed and the longitudinal axis of said chip space extends in a horizontal direction along the machine bed, wherein the linear motor is arranged on the top side of the machine bed laterally and parallel to the channel-like chip space. First and second guide rails of the horizontal linear guide for guiding the workpiece table are arranged on opposite sides of the linear motor, i.e., the linear motor is located between two guide rails of the horizontal linear guide, said rails being arranged laterally on the top side of the machine bed adjacent to the linear motor.

The arrangement of a channel-like chip space in the longitudinal direction of the machine bed enables an improved collection and removal of the chips accumulating when the workpiece is machined, without the stability of the machine bed being impaired.

Arranging the linear motor for the workpiece table laterally adjacent to the chip channel ensures an efficient protection from accumulating flying chips. In addition, the arrangement of the linear motor and of the channel-like chip space in combination with the arrangement of the guide rails on both sides of the linear motor makes it possible to position various workpiece tables for the universal machine tool in an optimum way.

A turnable rotary table can be guided on the first and second guide rails, advantageously by means of ball or linear roller bearings.

In an advantageous embodiment, the machine structure has, f r this purpose, a third guide rail which, with respect to the first guide rail, is arranged on an opposite side of the channel-like chip space, and therefore the bottom side of a table slide, which carries an NC rotary table and is guided along the three guide rails, overlaps the channel and is moved directly above the channel along its entire longitudinal side when the linear motor is driven. This arrangement enables an optimum chip collection when a workpiece clamped on the NC rotary table is machined.

In an alternative embodiment, the universal machine tool can be equipped for 5-axis machining, with a swivel rotary table that is advantageously also guided on first and second guide rails by means of ball or linear roller bearings, wherein the bottom side of the table slide covers the linear motor.

The swivel rotary table is advantageously equipped with a swivel axis that enables a swivel angle of >180°, preferably up to 220°, so as to move the tool table to an upside-down position in which a workpiece clamped on the workpiece table can be machined by the work spindle, wherein the chips fall directly into the channel-like chip collecting space.

The channel-like chip space of a preferred exemplary embodiment is inserted in the top side of the machine bed and has side walls steeply sloping towards a bottom region. In addition, angular plates are mounted directly on the table and protrude downwardly into the channel-like chip space so as to ensure that the accumulating chips are conveyed directly into the chip space.

In a preferred exemplary embodiment, the channel-like chip space extends centrally in the machine bed in the Z-axis shown in FIGS. 1 and 2.

A chip screw conveyor for removing chips disposed in the chip space is advantageously provided at the bottom of the channel-like chip space in a horizontal direction.

The configuration of the machine bed of the universal machine tool is particularly advantageous in the case of a moving column-bed design of the universal machine tool since the machine stability necessary for precision machining is reliably ensured.

In a particularly stable version of the machine tool for machining workpieces, the machine column is equipped with three vertical and parallel guides along which the work spindle is guided, wherein the middle guide carries the load which is produced by the magnetic force of a linear motor that is provided for moving the work spindle in a vertical direction. In this way, the stability of the machine design can be further improved in the area of the moving column, without having to increase the masses contributing to stability. Surprisingly, this is particularly advantageous in the case of moving column-bed type machine tools in which the moving column is made as a triangular closed box design, as is the case, e.g., in DE 102 45 058 A1 described at the beginning, since the stability of a machine model of this type is thus particularly increased when the high-speed spindle is moved.

The machine bed configuration disclosed herein enables an optimum removal of machining chips for configurations having NC rotary tables and also for machine tools with a swivel rotary table for 5-axis machining, without having to make further design modifications to the machine. The basic configuration described herein can be realized according to the required conditions or customer's desire without further modification using both an NC rotary table and a swivel rotary table, in both cases a reliable chip removal being ensured over the entire travel of the respective workpiece table.

DESCRIPTION OF THE DRAWINGS

Further details and advantages of the present invention become apparent by means of the following description of exemplary embodiments of the universal machine tool including a chip space using the drawings, wherein.

DETAILED DESCRIPTION

Figure 1:
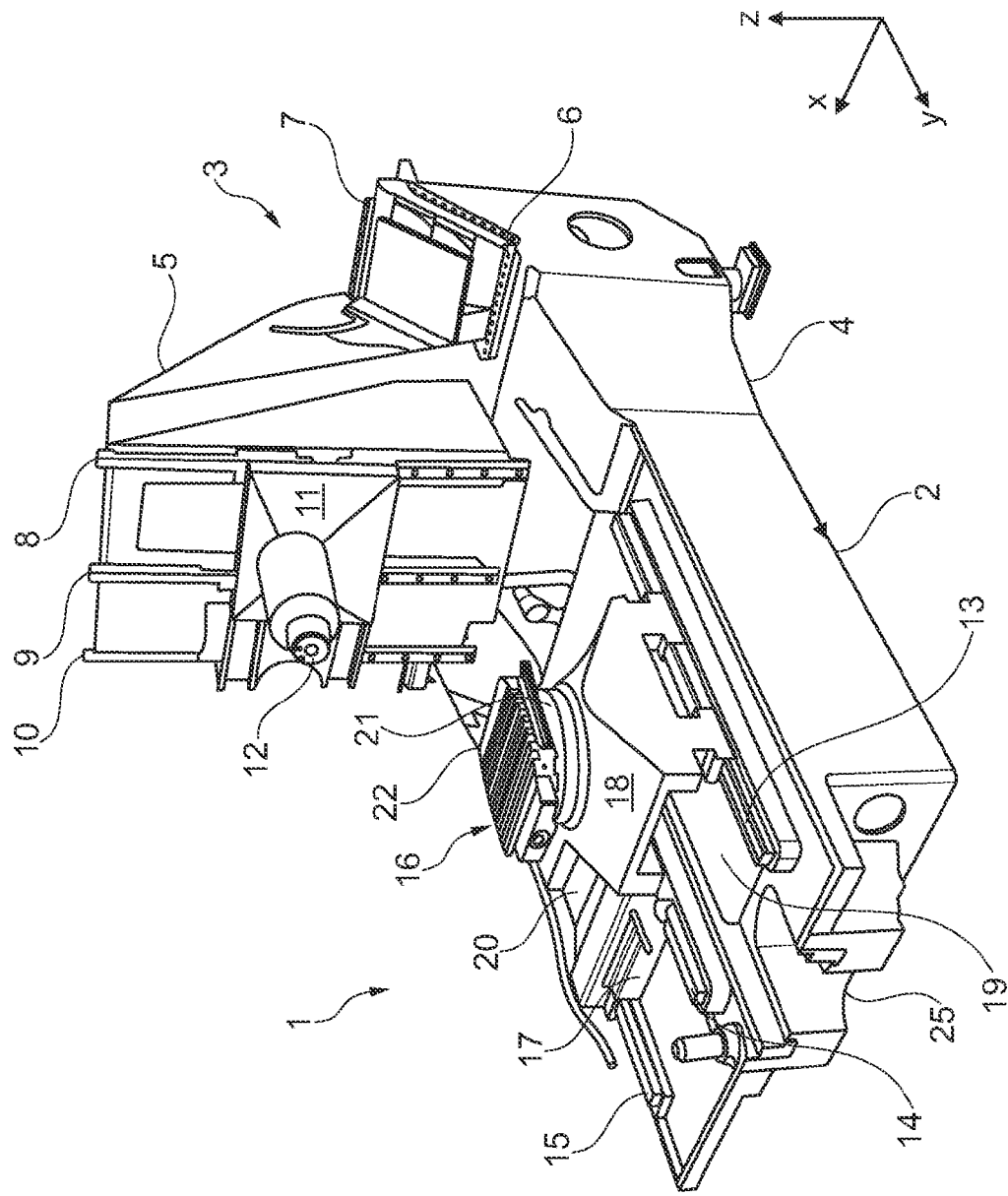
FIG. 1 shows a perspective view of a first exemplary embodiment of a universal machine tool including an NC rotary table.

A first exemplary embodiment of a universal machine tool including an NC rotary table is shown in a perspective inclined front view in FIG. 1. The universal machine tool having a moving column-bed design consists of a front machine bed 2 made as a box design and a rear stationary moving column 3 at the front end of which the box-shaped machine bed 2 is attached. In this embodiment according to FIG. 1, the column is made of two parts and has a bottom part 4 which is permanently fixed to the machine bed 2 and a moving column part 5 which can be moved in two guide rails 6 and 7 in the X-direction by means of a linear motor. The moving column part 5 has a front side including three vertical guide rails 8, 9, 10, on which a vertical slide 11 with a spindle head 12 for receiving a cutting tool is movably arranged by means of a linear motor 70. The middle guide rail 9 carries the load of the magnetic drive. The machine bed is supported via the two supports 2a, 2b towards the bottom.

The top side of the box-like machine bed 2 accommodates three guide rails 13, 14, 15 of a horizontal linear guide, on which a workpiece table 16 is movably guided in a Z-direction by means of a linear motor. The linear motor (not shown in FIG. 1) for moving the table slide is arranged between the guide rails 14, 15 and is protected toward the top by a cover 20.

A table slide 18 carries an NC rotary table 21, the top side of which carries a pallet 22 which is suitable for clamping a workpiece (not shown). The bottom side of the table slide 18 is movably arranged directly above a channel-like chip space 19, the structure of which is more clearly seen in FIG. 3.

In the front area of the machine bed, a recess having a U-shaped section 25 is inserted in the machine bed 2, which enables the connection of a pallet changer (not shown in FIG. 1). The spatial arrangement of the channel-like chip space 19, which directly borders on the U-shaped wall portion of the machine bed enables an optimum space efficiency with the machine bed configuration, and therefore the universal machine tool is also compact when designed as a machining center having a pallet changer.

Figure 2:
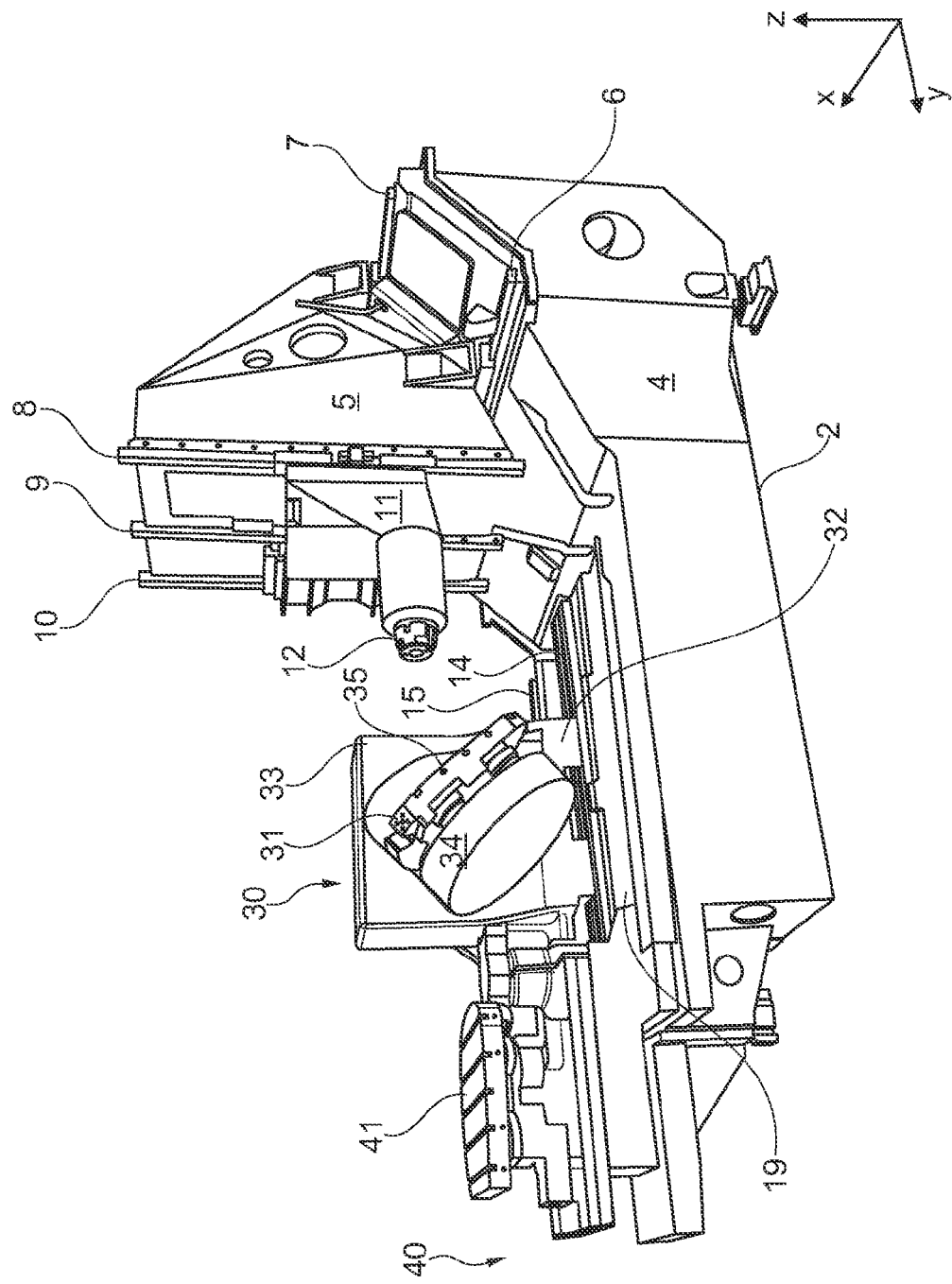
FIG. 2 shows a perspective view of a further exemplary embodiment of a universal machine tool which includes a chip space and on which a swivel rotary table is mounted.

FIG. 2 shows an inclined front view of a further exemplary embodiment of a universal machine tool, said exemplary embodiment differing from that shown in FIG. 1 in that the machine bed 2 of this exemplary embodiment carries a swivel rotary table 30, and in addition a pallet changer 40 is attached to the front area of the machine bed 2, said pallet changer having an exchangeable pallet 41 for exchange with the pallet 31 supported on the swivel rotary table 30.

The swivel rotary table 30 comprises a lower slide part 32 which is guided on the guide rails 14, 15 and carries a box-shaped table housing 33. A drive motor for swiveling the console 34 of the machine table is attached to or accommodated in or at the box-shaped housing 33. By means of said motor, the working plane of the workpiece table can be rotated, as explained in detail below with reference to FIGS. 5 and 6. By means of the swivel axis, it is possible to take the working plane of the workpiece table 34 by swiveling the console 34 to an upside-down position which is shown in FIG. 6, and therefore the working plane 35 of the workpiece table which is swiveled so as to be upside-down can be positioned directly above the chip channel 19.

A pallet changer 40 is attached to the front head end of the machine bed 2 and is inserted in the recess that has a U-shaped section and is shown in FIG. 1. The compactness here results, above all, from the fact that the pallet changer can be attached directly to a machine bed portion which borders on the channel-like chip space so as to guarantee, on the one hand, that the pallet changer must only travel short distances when the pallet is exchanged and, on the other hand, that even in the basic exchange position of the pallet changer, the workpiece table is also already arranged directly above the channel-like chip space.

Figure 3:
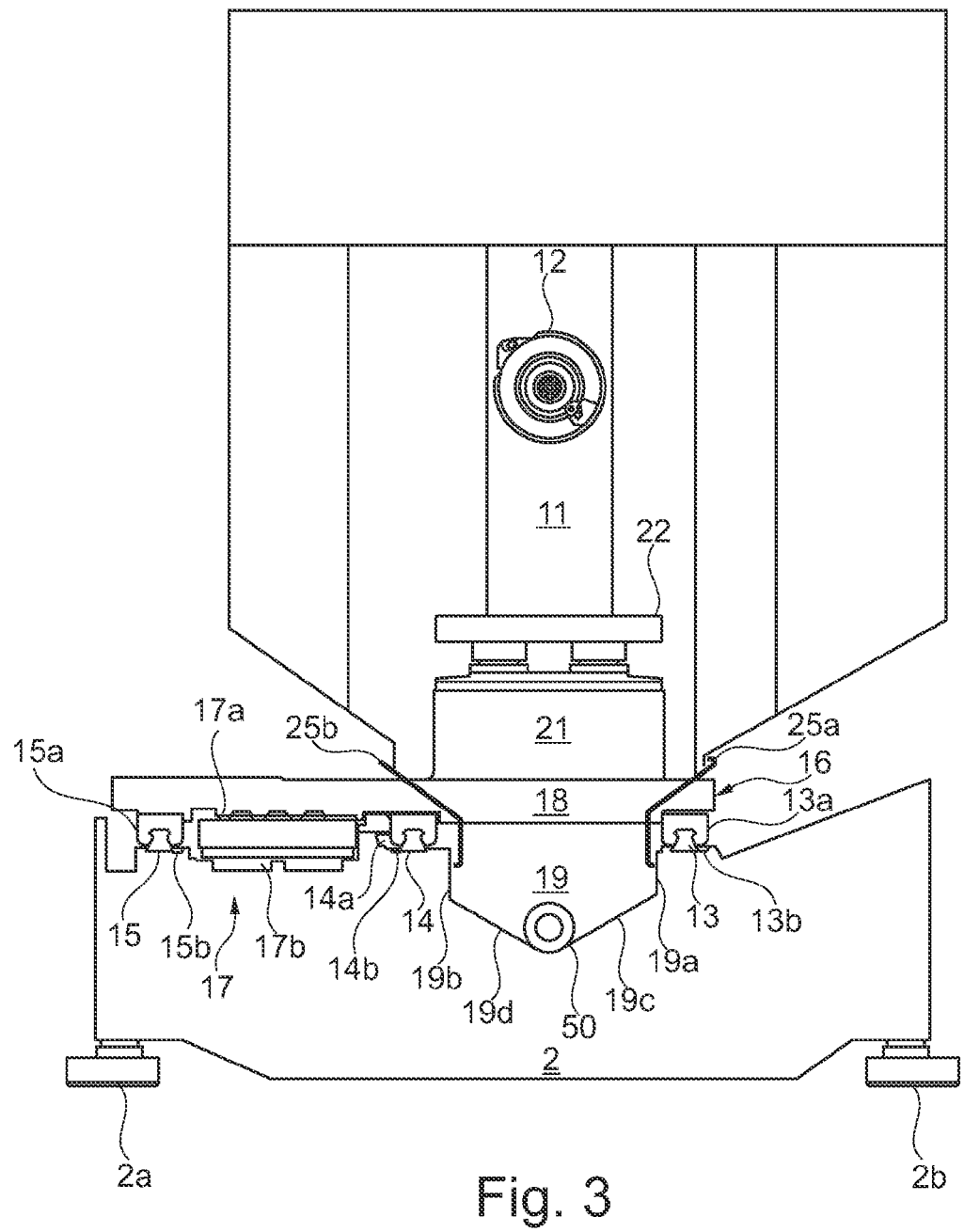
FIG. 3 shows a cross-section of an exemplary embodiment of a universal machine tool including a chip space and an NC rotary table as illustrated in FIG. 1.

FIG. 3 shows a cross-section through the machine bed 2 of the exemplary embodiment of FIG. 1, said cross-section clearly showing the structure of the channel-like chip space 19 in the machine bed 2.

The chip channel 19 is formed by two almost vertically sloping side walls 19a, 19b. The bottom area of the channel is formed by the slightly inclined bottom portions 19c, 19d. The area of the lowest point at the bottom of channel 19 accommodates a conveyor screw 50 which serves for removing the accumulating chips. Angular guide plates 25a, 25b are mounted on the workpiece table and ensure that the chips accumulating when a workpiece clamped on the pallet 22 is machined are directly fed to the channel-like chip space so as to prevent, in particular, contamination of the horizontal linear guide and the linear motor 17. These angular guide plates 25a, 25b, which are mounted in the longitudinal direction of the machine bed advantageously on the front and rear sides of the workpiece table, move at the front end of the machine bed into a recess of the pallet changer or the machine bed portion receiving the same and at the rear side into a recess formed for this purpose in the front end of the moving column, and therefore the travel of the table is not limited by the guide plates.

On the bottom side, the workpiece table 16 has a table slide 18, at the bottom side of which linear roller bearings 13a, 14a, 15a are mounted which are guided on the profile rails 13, 14, 15. The table slide 18 is movable by means of the linear motor 17 in the Z-direction shown in FIG. 1, wherein the linear motor primary part 17a is connected to the console of the table slide 18 and is guided along the linear motor secondary part 17b which is formed on magnetic path segments. In this connection, it is advantageous for the linear motor primary part 17a and the linear motor secondary part 17b to be arranged in a width-wise direction between the profile rails 14, 15 and parallel to the channel-like chip space 19 which, in turn, extends along the entire length of the linear guide rails 13, 14, 15 and parallel thereto.

The profile rails are advantageously provided with thermo-symmetrical linear measuring scales 13b, 14b, 15b, which contribute considerably to the accuracy of the determination of the position of the workpiece table.

The table slide 18 carries a cylindrical middle part 21, the top side of which supports a workpiece pallet 22 that can hold a workpiece in clamped fashion by means of a suitable clamping device. As evident from the illustration of FIG. 3, the table slide 18 overlaps the channel-like chip space in the width-wise direction, wherein the top side of the workpiece table 16, on which the workpiece (not shown) is clamped, is arranged so as to be moveable directly above the channel and over its entire length in a Y-direction.

An improved stability of the guide is achieved by guiding the NC rotary table in the three guide rails 13, 14, 15. An optimum protection of the linear motor from accumulating chips is simultaneously achieved by a lateral displacement of the linear motor with respect to the plane of the channel-like chip space or the movement plane of the NC table. In addition, the inventive structure of the machine bed enables an optimum combination of the machine tool with a chip conveyor.

A cross-section through a universal machine tool, as shown in the exemplary embodiment of FIG. 2, is explained below by means of FIG. 4. Reference signs identical to those in FIGS. 2 and 3 refer to corresponding parts without special mention.

Figure 4:
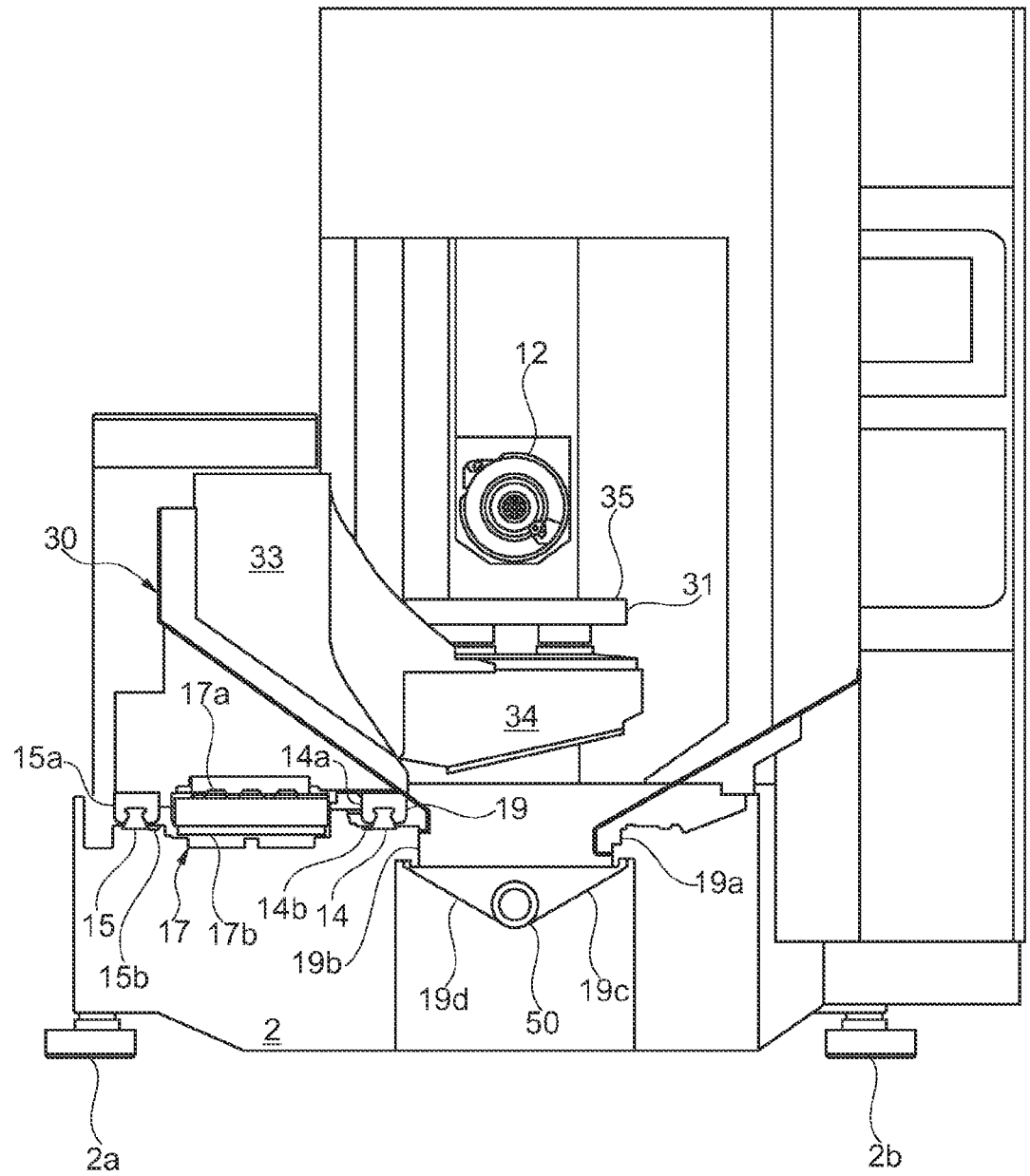
FIG. 4 shows a cross-section of an exemplary embodiment of a universal machine tool including a chip space and a swivel rotary table as illustrated in FIG. 1.

In the example illustrated in FIG. 4, an overhung swivel rotary table 30 is mounted on the universal machine tool, said table being guided via linear roller bearings 14a, 15a, which are mounted on the bottom side of the table housing 33, in the profile rails 14, 15 of the horizontal linear guide. The drive for moving the swivel rotary table 30 in a Z-direction is accomplished via the linear motor 17 which is arranged between the guide rails 14, 15, wherein the linear motor primary part 17a oriented horizontally in cross-section is mounted on the bottom side of the housing 33 of the swivel rotary table 30 and is moved along the linear motor secondary part 17b. As in the exemplary embodiment of FIGS. 1 and 3 and as illustrated in FIG. 2, the channel-like chip space extends along the entire length of the guide rails 14, 15, and therefore a reliable feed of the accumulating chips into the chip space is ensured in every operating position of the swivel rotary table 30 movable in a Z-direction.

In the basic position of the swivel rotary table, the working area for clamping the workpiece on the workpiece table 35 is oriented horizontally on the protruding console 34 and is arranged below the work spindle 12. By means of a swivel axis which is not shown in FIG. 4, the console 34 of the swivel rotary table 30 can, however, be swiveled upwards about a swivel axis in a horizontal drawing plane, and therefore the surface 35 of the swivel rotary table on which the workpiece is clamped is arranged above the work spindle in an upside-down position.

Optimum removal of the accumulating chips into the chip space is ensured in every operating position of the work spindle and of the swivel rotary table by the arrangement described herein and the movability of the swivel rotary table via the channel-like chip space in any swivel position of the workpiece table.

In this exemplary embodiment too, the channel-like chip space has almost vertical side walls 19a, 19b to which a bottom portion having the inclined bottom portions 19c, 19d is attached. As in the preceding exemplary embodiment, a chip conveyor screw 50 is provided at the lowest point of the bottom of the channel-like chip space in the exemplary embodiment of FIG. 4, said conveyor screw serving for removing the accumulating chips.

The arrangement of the guide rails of the linear motor and of the channel-like chip space in the machine bed of the universal machine tool, and in particular in the moving column-bed model, ensures that in both the use of an NC rotary table and the use of a swivel rotary table, the workpiece table top side is moved directly above the channel-like chip space so as to ensure optimum chip removal in every operating position. Due to the steeply sloping side walls of the channel-like chip space in combination with the lateral arrangement of the guide plates, an optimum collection of the chips is ensured, which is, in particular, important for a dry processing operation on the machine tool.

Figure 5:
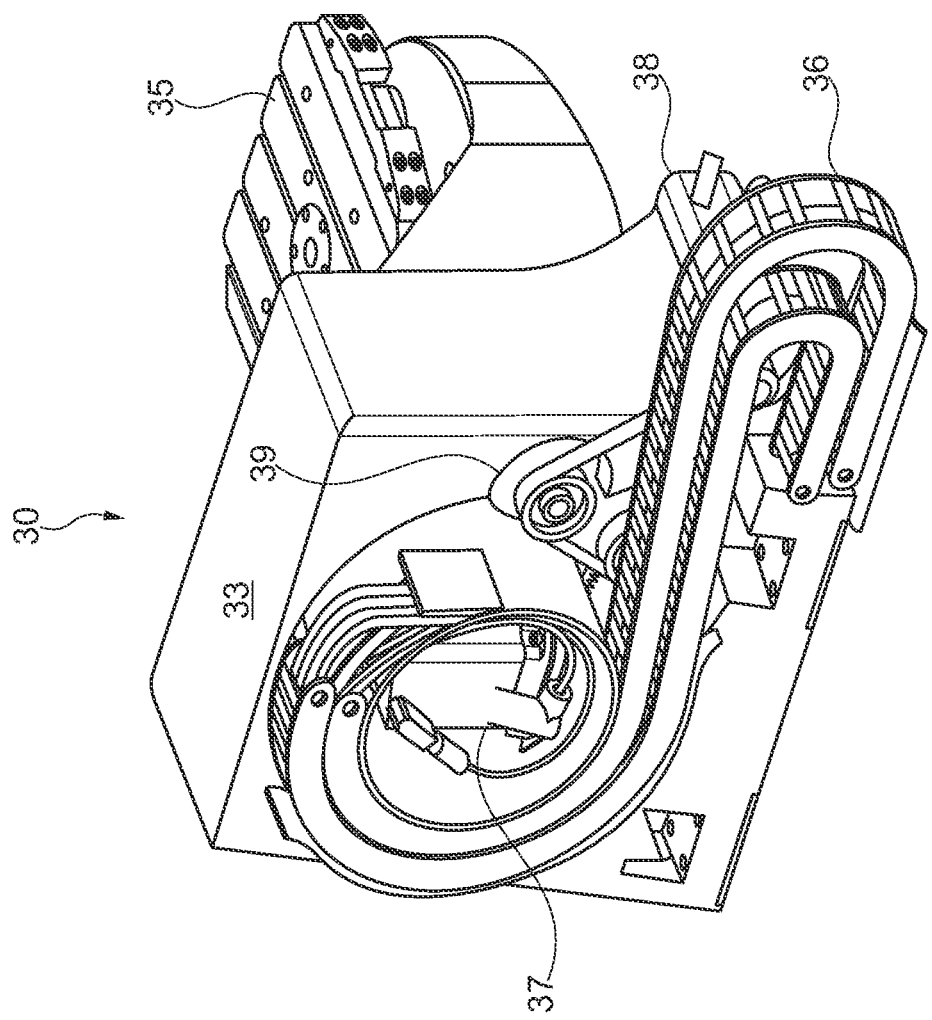
FIG. 5 shows a perspective view of an exemplary embodiment of a swivel rotary table for assembly on a universal machine tool.
Figure 6:
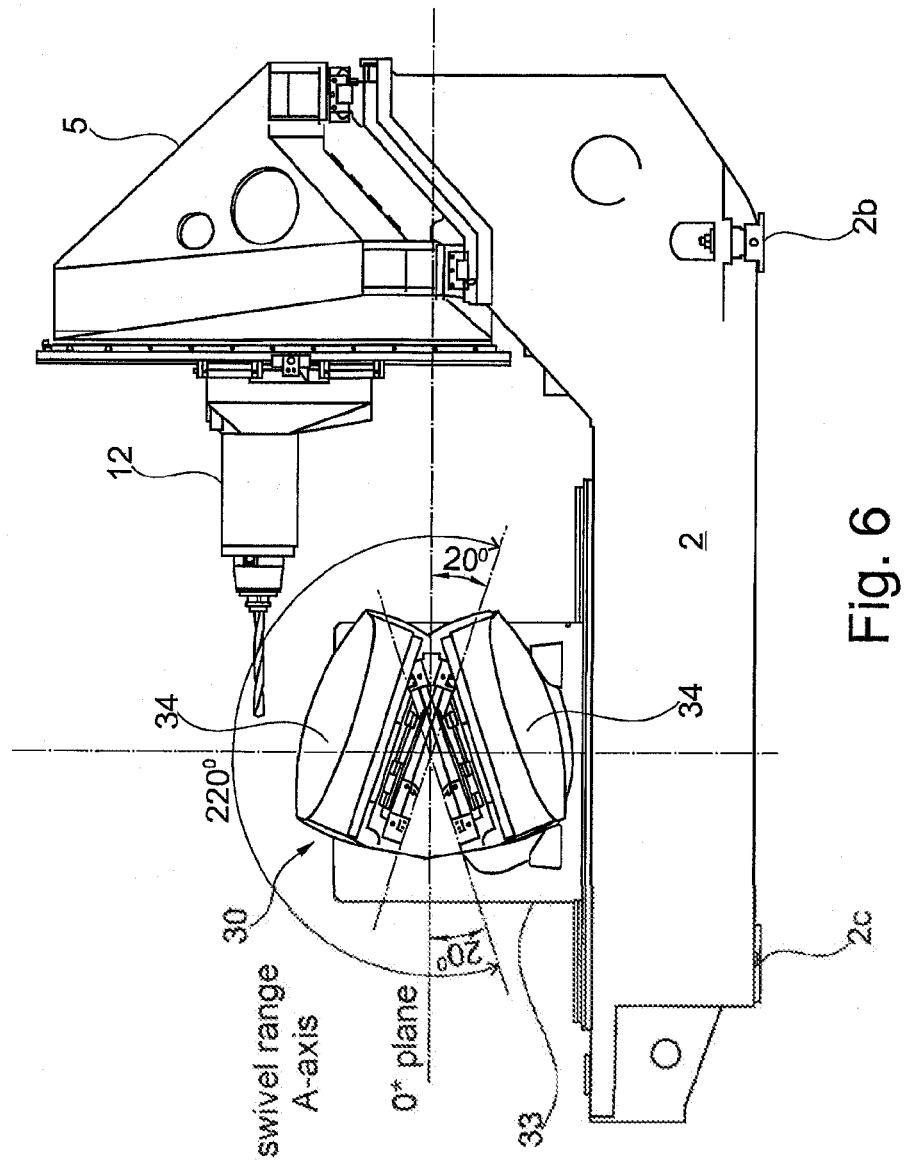
FIG. 6 shows a schematic diagram of a universal machine tool including a swivel rotary table to illustrate the swivel range.

FIG. 5 shows details of a preferred embodiment of a swivel rotary table for use with the machine configuration described herein. It should be noted here that the swivel rotary table shown in FIG. 5 is not confined to use with the machine configuration described herein but can also be employed in conventional machine tools. For this reason, separate protection may be sought for the central features of the swivel rotary table.

The swivel rotary table comprises two electric motors 37 and 38 for turning and swiveling the table 30 about an A-axis shown in FIG. 6. Here, the motor 38 is mounted outside the housing 33 on the outer side thereof, and the motor 37 is mounted centrally in the housing. At least one of the motors 37, 38, preferably both motors as shown in the swivel rotary table of FIG. 5, is arranged in the range of the housing 34 outside the cast parts of the machine. The advantage is that the motors are well accessible on the one hand, which is useful in the case of a repair or exchange, and in addition they are arranged outside the zone of thermal influence, i.e., in the temperature-neutral portion and not in the overhung portion, and therefore their functioning is not impaired by heat transfer caused by the cast parts. In addition, the motors 37, 38 which are not arranged in the overhung portion of the console 34 of the swivel rotary table are not exposed to any weight load, which also adds to the positioning accuracy.

A cable carrier system for conducting electric supply cables to the motor 37 is mounted on the rear side of the table housing 33, which ensures an efficient and reliable cable guiding for operating the motors when the swivel rotary table 30 is moved. The drive torque of the motor 38 for pivoting the console is transmitted to the transmission 39 via a V-belt.

FIG. 6 illustrates the swivel range of the swivel rotary table for use with a machine configuration described herein. The diagram illustrates that the swivel axis (A-axis) enables swiveling of the working plane 35 of the tool table by up to 220°, which allows optimum 5-axis processing.

Because of this swivel range, optimum processing of workpieces in an upside-down position is possible, wherein a combination of the swivel rotary table and of the machine configuration ensures a reliable removal of the accumulating chips via the channel-like chip space.

The achievable acceleration or speed values, which can be $20/S^2$ and/or 20 minutes$^{-1}$ for the A-axis and $30/S^2$ and 40 minutes$^{-1}$ for the axis of rotation, are further features of the swivel rotary table.

The invention is not confined to the presented exemplary embodiments but comprises further combinations of the structural details presented in this description so as to create further exemplary embodiments according to the required use on the basis of the knowledge of a person skilled in the art.

The embodiments of the invention in which an exclusive property or privilege is claimed are defined as follows:

1. A machine tool for machining a workpiece, comprising:
   a machine column;
   a work spindle movable in guides along the machine column in first and second coordinate axes by means of a motor and is adapted to receive a cutting tool; and
   a machine bed arranged on a front end of the machine column wherein, on a top side of the machine bed, a horizontal linear guide is arranged for a workpiece table, and a linear motor for moving the workpiece table along the horizontal linear guide in a third coordinate axis,
   wherein a channel-like chip space is integrated in the top side of the machine bed for collecting chips accumulating when the workpiece is machined, the longitudinal axis of said channel-like chip space extending in the direction of the third coordinate axis,
   wherein the linear motor is arranged on the top side of the machine bed laterally and parallel to the channel-like chip space, wherein first and second guide rails of the horizontal linear guide are arranged for guiding a workpiece table on opposite sides of the linear motor, and
   wherein, on the top side of the machine bed, a third guide rail of the horizontal linear guide is arranged on a side of the channel-like chip space, which side is opposite to the first and second guide rails.

2. The machine tool for machining a workpiece according to claim 1, wherein the machine tool comprises a movable NC rotary table, the slide of which is guided via guide shoes on the first, second, and third guide rails of the horizontal linear guide and overlaps the channel-like chip space in the width-wise direction so as to move the NC rotary table directly above the channel-like chip space by the linear motor.

3. The machine tool for machining a workpiece according to claim 1, wherein the machine tool has an overhung movable NC swivel rotary table for 5-axis processing, which includes a console for carrying a workpiece pallet, the slide of which is guided via guide shoes on the first and second guide rails and covers the linear motor in the width-wise direction.

4. The machine tool for machining a workpiece according to claim 1, wherein a chip conveyor screw for removing chips is arranged in the longitudinal direction at the bottom of the channel-like chip space.

5. The machine tool for machining a workpiece according to claim 1, wherein the machine bed is made in one piece with a 3-point support.

6. The machine tool for machining a workpiece according to claim 1, wherein angular guide plates are laterally fixed to the workpiece table and protrude into the channel-like chip space on the bottom side of the table.

7. The machine tool for machining a workpiece according to claim 3, wherein the swivel rotary table has a swivel axis including a swivel angle of at least 180° so as to be able to move the workpiece table into an upside-down position in which a workpiece clamped on the swivel rotary table is positioned directly above the channel-like chip space.

8. The machine tool for machining a workpiece according to claim 1, wherein the machine column is provided with three vertical guides along which the work spindle is guided, wherein the middle guide carries the load which is produced by the magnetic force of a linear motor provided in a vertical direction for moving the work spindle.

\* \* \* \* \*